United States Patent [19]

Lehr et al.

[11] 4,392,962

[45] Jul. 12, 1983

[54] PROCESS FOR SEPARATING METALS FROM AQUEOUS SOLUTIONS

[75] Inventors: Klaus Lehr, Hürth-Knapsack; Gero Heymer; Christian May, both of Erftstadt; Hermann Klein, Hürth, all of Fed. Rep. of Germany

[73] Assignee: Hoechst Aktiengesellschaft, Fed. Rep. of Germany

[21] Appl. No.: 318,736

[22] Filed: Nov. 6, 1981

[30] Foreign Application Priority Data

Nov. 13, 1980 [DE] Fed. Rep. of Germany ....... 3042724

[51] Int. Cl.³ .............................................. C02F 1/62
[52] U.S. Cl. .................................... 210/688; 210/912; 210/914; 75/117; 75/118 R; 75/121; 423/22; 423/25; 423/99
[58] Field of Search ............. 75/108, 109, 117, 118 R, 75/121; 210/688, 694, 681, 683, 684, 685, 686, 670, 912, 913, 914; 423/22, 25, 99

[56] References Cited

U.S. PATENT DOCUMENTS

| | | | |
|---|---|---|---|
| 3,429,808 | 2/1969 | Smith | 210/688 |
| 3,873,581 | 3/1975 | Fitzpatrick | 210/688 |
| 3,900,422 | 8/1975 | Terajima | 210/688 |
| 4,133,755 | 1/1979 | Tarao | 210/688 |
| 4,238,334 | 12/1980 | Halbfoster | 210/694 |
| 4,239,865 | 12/1980 | Tarao | 210/688 |

OTHER PUBLICATIONS

Chem-Ing-Techn. 50 (1978), No. 5, pp. 332-337, Kreysa.
Gmelins Handbuch der Anorganischen Chemie, System No. 16, Part 13, pp. 322-329.

*Primary Examiner*—Ernest G. Therkorn
*Attorney, Agent, or Firm*—Connolly and Hutz

[57] ABSTRACT

The invention relates to a process for separating seminoble and/or noble metals from an aqueous solution having compounds of these metals dissolved therein by subjecting the solution to reaction with red phosphorus. More particularly, the solution is conveyed through a zone containing a layer of granular red phosphorus particles with a size of 0.01 to 10 mm, which may be used in admixture with active carbon.

9 Claims, No Drawings

PROCESS FOR SEPARATING METALS FROM AQUEOUS SOLUTIONS

The present invention relates to a process for separating seminoble and/or noble metals from aqueous solutions having compounds of these metals dissolved therein, by subjecting the solutions to reaction with red phosphorus.

It is known that mercury, copper, silver, gold and further noble metals can be produced or recovered from aqueous solutions which are obtained in industry. This is necessary for reasons of environmental protection as regards mercury, and highly desirable for reasons of economy, as regards the other metals specified. As to mercury, it has been suggested that it should be separated from aqueous solutions either by precipitating it (cf. U.S. Pat. No. 3,788,842) or with the use of ion exchangers (cf. U.S. Pat. No. 3,085,859) or by subjecting it to a liquid/liquid extraction procedure (cf. Quim. Ind. (Madrid), 1978, 24 (2), pages 137 and 139-142), or by reducing it to metal by means of hot air (cf. U.S. Pat. No. 4,160,730).

It has also been described that dissolved metal compounds of copper, silver, palladium and mercury can be separated electrochemically from their aqueous solutions with the use of fixed or fluidized bed cells (cf. Chem-Ing-Techn. 50 (1978), No. 5, pages 332-337).

It has finally been described that by subjecting an aqueous solution of salts of mercury, copper, silver, gold, palladium or osmium to treatment with red phosphorus, it is possible to effect the separation of the metals or their phosphides (cf. Gmelins Handbuch der Anorganischen Chemie, System No. 16, Part B, (1964), pages 322-329).

Disadvantages which are encountered with these prior processes reside in the fact that it is necessary for them to be carried out with expensive machinery, or that it is necessary for the waste water to be subjected to prepurifying treatment so as to remove dirt particles therefrom, or that the metal is separated from the waste water to an unsatisfactory extent only.

It is therefore an object of the present invention to provide a process for separating metals, such as mercury, copper and noble metals from an aqueous solution having compounds of these metals dissolved therein, which can be carried out with little expenditure of machinery, at high space/time-yields, and with formation of practically metal-free water.

To this end, the invention provides for the aqueous solution having compounds of seminoble and/or noble metals dissolved therein to be conveyed through a treatment zone containing a layer of red phosphorus particles with a size of 0.01 to 10 mm.

Further preferred features of the present process provide:

(a) for the red phosphorus particles to have a size of 0.25 up to 1 mm;
(b) for the red phosphorus particles to have a chemically activated surface area;
(c) for the red phosphorus to be chemically activated with the use of bleaching liquor;
(d) for the red phosphorus to be used in admixture with active carbon, the latter being used in a proportion of up to 98 weight %;
(e) 1 for the active carbon to be used in a proportion of 15 to 40 weight %;
(f) for the aqueous solution coming from the treatment zone to be conveyed through a second zone having active carbon particles placed therein;
(g) for the active carbon particles to have a size of 0.01 to 10 mm;
(h) for the active carbon particles to have a size of 0.25 to 1 mm.

The process of the present invention can be used to effect the separation of metals having a positive normal potential, such as copper, silver, gold, mercury or platinum metals.

It is possible for the present process to be carried out continuously in a column in upright position of which the lower end is closed by means of a plate or gauze wire supporting a layer of red phosphorus placed therein. The supporting function of the plate or gauze wire should preferably be improved by depositing the layer of red phosphorus on a layer of fine particulate material, such as sand or active carbon.

EXAMPLE 1

(Comparative Example)

2 l mercury chloride solution containing 50 mg $Hg^{++}$/liter was placed in a beaker and contacted with thorough agitation with 250 g red phosphorus (particle size=250 to 500 microns). Various specimens of clear supernatant solution were taken at 10 minutes reaction intervals with agitation, and analyzed for their content of mercury. The analytical results obtained are indicated in the following Table:

TABLE

| Reaction period (min) | Mercury content (mg/l) |
|---|---|
| 10 | 4.0 |
| 20 | 3.2 |
| 30 | 2.8 |
| 40 | 1.9 |
| 50 | 1.3 |
| 60 | 1.0 |

EXAMPLE 2

(Comparative Example)

Two 1-liter round flasks connected together by a bridge were used. 20 g red phosphorus particles, of which 60% had a size of less than 0.075 mm, were placed in each flask and fluidized in water with the aid of a stirrer. Arranged downstream of the two flasks was a filter of quartz wool and Raschig rings to avoid removal of red phosphorus. Passed through the flasks with continuous agitation were 2 l/h mercury chloride solution containing 50 mg $Hg^{++}$/l, 5 g NaCl/l and 11 mg $Cl_2$/l. The liquid coming from the flask contained between 0.1 and 0.5 mg/l mercury.

EXAMPLE 3

(Invention)

A column 4 cm in diameter which had a layer of 25 g active carbon (Hydraffin 71, a product of Lurgi company; particle size=250 to 500 microns) placed therein was used. Placed on the active carbon layer was a blend of 75 g of said active carbon and 250 g red phosphorus (particle size 250 to 500 microns). Passed through the column was 2 l/h mercury chloride-containing water with 50 mg $Hg^{++}$/l therein. The column permitted altogether 350 g mercury to be absorbed therein, without the water running off containing more than 0.01 mg/l mercury.

EXAMPLE 4
(Invention)

A column 4 cm in diameter which had a layer of 100 g active carbon (Hydraffin 71, a product of Lurgi company; particle size=250 to 500 microns) placed therein was used. Placed on the active carbon layer was 250 g red phosphorus (particle size=250 to 500 microns). Passed through the column was 2 l/h of an aqueous mercury chloride solution (50 mg $Hg^{++}$/l), common salt (5 g/l) and chlorine (11 mg/l). Altogether 608 g mercury was retained in the column without the water running off containing more than 0.01 mg/l mercury.

EXAMPLE 5
(Invention)

The column was as in Example 3. Passed therethrough was 2 l/h of an aqueous solution the same as that used in Example 4. Altogether 550 g mercury was retained in the column without the water running off containing more than 0.01 mg/l mercury.

EXAMPLE 6
(Invention)

The column was as in Example 3. Passed therethrough was 2 l/h of an aqueous solution of mercury chloride (50 mg $Hg^{++}$/l) and common salt (5 g/l). The liquid running off contained less than 0.01 mg/l mercury. After 176 g of mercury was found to have been retained in the column, the experiment was interrupted. "Break through" was not observed.

EXAMPLE 7
(Invention)

A column 4 cm in diameter which had a layer of 50 g active carbon (Hydraffin, a product of Lurgi company; particle size=250 to 500 microns) placed therein was used. Placed on the active carbon layer was a blend of 150 g of said active carbon and 500 g red phosphorus (particle size=250 to 500 microns). Passed through the column was 2 l/h of an aqueous solution of mercury chloride (50 mg $Hg^{++}$/l), common salt (250 g/l) and chlorine (11 mg/l). The column permitted 232 g mercury to be absorbed therein without the water running off containing more than 0.01 mg/l mercury.

EXAMPLE 8
(Invention)

Example 7 was repeated but column and solution were maintained at a temperature of 45° C. and the aqueous solution contained 10 mg $Hg^{++}$/l. The column permitted 41 g mercury to be absorbed therein without the water running off containing more than 0.01 mg/l mercury.

EXAMPLE 9
(Invention)

Passed through a column the same as that used in Example 4 was an aqueous silver nitrate solution (50 mg/$Ag^+$/l), the solution remaining in the column over a period of 15 minutes. The water running off contained less than 0.05 mg/l residual silver. After 27 g silver was found to have been retained in the column, the experiment was interrupted. "Break through" did not occur.

EXAMPLE 10
(Invention)

Passed through a column the same as that used in Example 4 was an aqueous silver sulfate solution (50 mg $Ag^+$/l), the solution remaining in the column over a period of 15 minutes. The water running off contained less than 0.05 mg/l residual silver. After 20 g silver had been retained in the column, the experiment was interrupted. "Break through" did not occur.

EXAMPLE 11
(Invention)

Passed through a column the same as that used in Example 3 was an aqueous copper sulfate solution (50 mg $Cu^{++}$/l), the solution remaining in the column over a period of 15 to 30 minutes. The water running off contained about 0.2 mg/l residual copper. 129 g copper were retained in the column without "break through."

EXAMPLE 12
(Invention)

A column 10 cm in diameter which had a layer of 250 g active carbon (Epibon DG, a product of Lurgi company; particle size=3 mm) placed therein was used. Placed on the active carbon layer was a blend of 750 g of said active carbon and 4000 g red phosphorus (particle size=3 mm). Passed through the column was 1 l/h water containing mermercury chloride (50 mg $Hg^{2+}$/l). Altogether 200 g mercury was retained in the column without the water running off containing more than 0.01 mg/l mercury.

EXAMPLE 13
(Invention)

A column 4 cm in diameter which had a layer of 25 g active carbon (Hydraffin 71, a product of Lurgi company; particle size 250 to 500 microns) placed therein was used. Placed on the active carbon layer was a blend of 75 g of said active carbon and 250 g red phosphorus (particle size=250 to 500 microns). Passed through the column was 1 l/h water containing palladium chloride (50 mg $Pd^{2+}$/l). Altogether 144 g palladium was retained in the column without the water running off containing more than 0.1 mg/l palladium (analytical limit of detection).

A comparison of Examples 1 and 2 with Examples 3 to 8 and 12 which illustrate the invention shows that the water running off unexpectedly has very low residual mercury contents, reduced by more than two powers of ten, based on the content determined for the discontinuous operation described in Example 1, and reduced by more than one power of ten, based on the content determined for the continuous operation described in Example 2. Examples 4, 5, 7 and 8 also show that the present process permits mercury to be separated approximately quantitatively even in the presence of oxidants.

We claim:
1. A process for separating a seminoble or noble metal, from an aqueous solution having a compound of a said metal dissolved therein, which comprises: passing said solution through a column subdivided into a plurality of zones, a lower zone containing a layer of active carbon particles having a size of 0.01 to 10 mm and an upper zone containing a layer of granular red phosphorus having a size of 0.01 to 10 mm.

2. The process as claimed in claim 1, wherein the red phosphorus particles have a size of 0.25 to 1 mm.

3. The process as claimed in claim 1, wherein the red phosphorus particles have a chemically activated surface area.

4. The process as claimed in claim 3, wherein the red phosphorus is chemically activated by means of bleaching liquor.

5. The process as claimed in claim 1, wherein the red phosphorus is used in admixture with active carbon, the thus-admixed active carbon being employed in a proportion of up to 98 weight %.

6. The process as claimed in claim 5, wherein the thus-admixed active carbon is used in a proportion of 15 to 40 weight %.

7. The process as claimed in claim 5, wherein the thus-admixed active carbon comprises particles having a size of 0.01 to 10 mm.

8. The process as claimed in claim 5, wherein the thus-admixed active carbon comprises particles having a size of 0.25 to 1 mm.

9. The process as claimed in claim 1, wherein the active carbon particles in said layer have a size of 0.25 to 1 mm.

* * * * *